(12) United States Patent
Shan

(10) Patent No.: US 11,487,524 B2
(45) Date of Patent: Nov. 1, 2022

(54) PROCESSING METHOD AND ELECTRONIC DEVICE

(71) Applicant: Lenovo (Beijing) Co., Ltd., Beijing (CN)

(72) Inventor: Xuebin Shan, Beijing (CN)

(*) Notice: Subject to any disclaimer, the term of this patent is extended or adjusted under 35 U.S.C. 154(b) by 0 days.

(21) Appl. No.: 16/429,314

(22) Filed: Jun. 3, 2019

(65) Prior Publication Data
US 2019/0369981 A1 Dec. 5, 2019

(30) Foreign Application Priority Data
Jun. 1, 2018 (CN) .......................... 201810559263.4

(51) Int. Cl.
*G06F 8/65* (2018.01)

(52) U.S. Cl.
CPC ........................ *G06F 8/65* (2013.01)

(58) Field of Classification Search
CPC ....... G06F 8/65; G06F 8/71; G06F 2221/0782
See application file for complete search history.

(56) References Cited

U.S. PATENT DOCUMENTS

| | | | |
|---|---|---|---|
| 9,378,011 B2* | 6/2016 | Ladki ................. | G06F 11/1433 |
| 9,535,685 B1* | 1/2017 | Wang ................. | G06F 8/61 |
| 2003/0177485 A1* | 9/2003 | Waldin, Jr. ............. | G06F 8/658 |
| | | | 717/169 |
| 2005/0137997 A1* | 6/2005 | Bussert ................ | G06F 8/65 |
| 2013/0152077 A1* | 6/2013 | Leitman ............... | G06F 8/65 |
| | | | 718/1 |
| 2013/0167134 A1* | 6/2013 | Shim ................... | G06F 8/654 |
| | | | 717/173 |
| 2014/0137114 A1* | 5/2014 | Bolte .................. | G06F 9/45558 |
| | | | 718/1 |
| 2019/0370471 A1* | 12/2019 | Petratos ............... | G06F 8/71 |
| 2020/0174775 A1* | 6/2020 | Sun ................... | G06F 8/71 |

FOREIGN PATENT DOCUMENTS

| | | | | |
|---|---|---|---|---|
| CN | 103324507 A | 9/2013 | | |
| CN | 103916846 A | 7/2014 | | |
| CN | 104267993 A | 1/2015 | | |
| CN | 107357613 B | * 9/2020 | .............. | G06F 8/65 |
| JP | 2010140220 A | 6/2010 | | |

* cited by examiner

*Primary Examiner* — Ziaul A Chowdhury
(74) *Attorney, Agent, or Firm* — Anova Law Group, PLLC

(57) ABSTRACT

The present disclosure provides a processing method including obtaining target update data for updating a target application from a first application version to a second application version; updating the target application from the first application version to the second application version according to the target update data, where the target update data correspond to the second application version of the target application; storing the target update data in a designated storage location; updating an operating system to a first system version from a second system version; and establishing, after the operating system is updated to the first system version, the target application having the second application version in the operating system of the first system version by using the target update data in the designated storage location, where the target update data remain unchanged when the operating system is updated.

15 Claims, 4 Drawing Sheets

PROCESSING METHOD AND ELECTRONIC DEVICE

CROSS-REFERENCE TO RELATED APPLICATION

This application claims priority of Chinese Patent Application No. 201810559263.4, filed on Jun. 1, 2018, the entire content of which is incorporated herein by reference.

TECHNICAL FIELD

The present disclosure relates to, but is not limited to, a processing method and an electronic device.

BACKGROUND

Smart devices, such as smart TVs and smart phones, etc., generally have an operating system. The smart devices usually come with some system applications at the factory and users can install some other applications, including third-party applications according to demands. These applications may be continuously improved to meet users' demand. A server may launch application update packages to upgrade these applications on the smart devices to the latest version. However, when the operating system of the smart device is updated (or reset to factory settings), a version of an application in the operating system may change (e.g., change back to the initial version)during the update, and the user may need to obtain the update package of each application again to ensure that the application is the latest version.

SUMMARY

In accordance with the disclosure, one aspect of the present disclosure provides a processing method. The processing method includes obtaining target update data for updating a target application from a first application version to a second application version; updating the target application from the first application version to the second application version according to the target update data, where the target update data correspond to the second application version of the target application; storing the target update data in a designated storage location; updating an operating system to a first system version from a second system version; and establishing, after the operating system is updated to the first system version, the target application having the second application version in the operating system of the first system version by using the target update data in the designated storage location, where the target update data remain unchanged when the operating system is updated.

Also, in accordance with the disclosure, another aspect of the present disclosure provides an electronic device including an obtaining unit, an updating unit and a storage unit. The obtaining unit is configured to obtain target update data for updating a target application from a first application version to a second application version. The update unit is configured to update the target application from the first application version to the second application version according to the target update data. The storage unit is configured to store the target update data in a designated storage location. After the operating system is updated to a first system version from a second system version, the target application having the second application version is established in the operating system of the first system version by using the target update data in the designated storage location. The designated storage location is a storage location where the target update data remain unchanged when the system version of the operating system is updated.

Also, in accordance with the disclosure, another aspect of the present disclosure provides an electronic device including a memory for storing computer-executable instructions, and a processor communicating with the memory to execute the computer-executable instructions. When the computer-executable instructions are executed by the processor, the process is configured to obtain target update data of a target application; update the target application from a first application version to a second application version according to the target update data, where the target update data correspond to the second application version of the target application; store the target update data in a designated storage location; update an operating system to a first system version from a second system version; and establish, after the operating system is updated to the first system version, the target application having the second application version in the operating system of the first system version by using the target update data in the designated storage location, where the target update data remain unchanged when the operating system is updated.

In the technical solutions of the embodiments of the present disclosure, the designated storage location is a storage location where the data remain unchanged when the system version of the operating system is updated. When the target update data of the target application is obtained, the target application can be updated to from the first application version to the second application version according to the target update data. Further, the target update data are stored in the designated storage location, such that after an operating system is updated from the second system version to the first system version, the target application can be updated from the first application version the second application version according to the target update data in the designated storage location. As such, when the operating system is updated, without re-obtaining the target update data, the target application having a desired version can be established in the current operating system.

DETAILED DESCRIPTION

The features and technical solutions of present disclosure are described in detail with reference to the accompanying drawings in the accompanying drawings. The accompany drawings are for illustrative purposes and are not intended to limit the present disclosure.

The technical solution of the embodiments of the present disclosure can be applied to an electronic device, including but not limited to a mobile phone, a tablet computer, a notebook computer, a desktop computer, an in-vehicle terminal, a smart home appliance, a wearable device, etc. The electronic device has an operating system, and has a system application under the operating system. Users can install a third-party application in the smart device. A target application in the embodiments of the present disclosure may be a system application or a third-party application.

Figure 1:
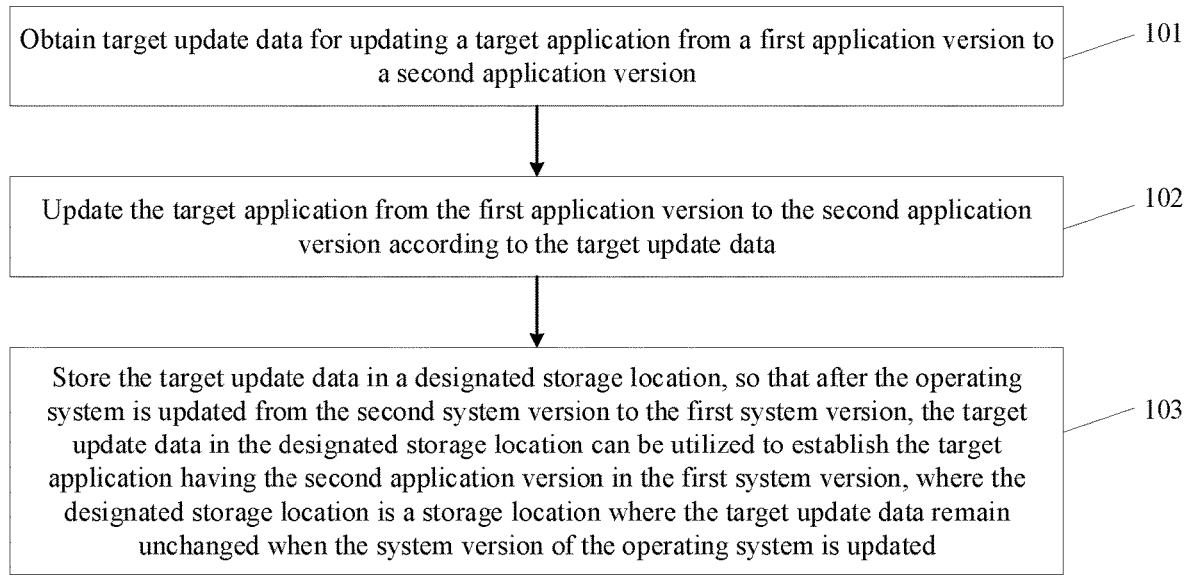
FIG. 1 is a schematic flowchart of a processing method according to some embodiments of the present disclosure.

FIG. 1 is a schematic flowchart of a processing method according to some embodiments of the present disclosure. As shown in FIG. 1, the processing method may include obtaining target update data for updating a target application from a first application version to a second application version (at 101).

In one example, the target application can be a system application, such as an alarm clock application, a wireless local area network application, a camera application, etc. In another example, the target application can be a third-party application, such as a video application, a gaming application, a shopping application, etc.

In the embodiment of the present disclosure, the target application may be updated from the first application version the second application version according to the target update data. In some embodiments, the first application version may be higher than the second application version. For example, the first application version may have a larger version number than the second application version. The first application version may be newer than the second application version. In this case, the target application can be restored to the second application version from the first application version according to the target update data. In some other embodiments, the first application version may be lower than the second application version. For example, the first application version may have a smaller version number than the second application version. The first application version may be older than the second application version. In this case, the target application may be upgraded to from the first application version to the second application version according to the target update data.

Obtaining the target update data of the target application may be implemented by, but not limited to, the following manners.

In some embodiments, the electronic device can obtain the target update data of the target application from a server side. For example, when the electronic device is online (e.g., accessing a network, i.e., interconnected with the server through the network), the electronic device can send a heartbeat data packet to the server. The heartbeat data packet carries a current version information (e.g., the first application version) of the target application. After receiving the heartbeat data packet, the server can determine that the electronic device is online and compare the first application version of the target application and the most updated application version of the target application. If the first application version is different from the most updated application version, the server can send the target update data of the most updated application version (e.g., the second application version) to the electronic device. The second application version is a higher version than the first application version, and the present disclosure is not limited thereto. The second application version can be different from the first application version. For example, when the first application version can be a higher version than the second application version, the server can send the target update data of the second application version to the electronic device. In some embodiments, the second application version is an application version that the user expects the target application to reach after the operating system is updated.

In some other embodiments, the electronic device acquires the target update data of the target application from other devices. For example, the electronic device acquires the target update data of the target application transmitted by another device through a point-to-point communication method (e.g., Bluetooth). For another example, the electronic device copies the target update data of the target application from an external storage device (such as a mobile hard disk). The target update data here correspond to the second application version of the target application. In comparison, a current version of the target application can be referred to as the first application version. In one example, the second application version may be a higher version than the first application version. In another example, the first application version may be a higher version than the second application version. The second application version can be an application version that the user expects the target application to reach after the operating system is updated.

The processing method further includes updating the target application from the first application version to the second application version according to the target update data (at 102).

In some embodiments, the target update data can be installation data for installing the target application having the second application version. The installation data may be a complete update packet. The target application having the second application version can be installed by executing the installation data of the second application version. The installation data may be a complete application file. The target application having the second application version can be installed by migrating the application file of the second application version to a designated directory. When the target application having the second application version is installed, the target application having the previous first application version can be replaced.

In some other embodiments, the target update data are incremental update data of the target application relative to the first application version. For example, the incremental update data may be a differential update package, and the differential update package records the difference between the installation data of the first application version and the installation data of the second application version. The target application can be upgraded from the first application version to the second application version by executing the incremental update data. For another example, the incremental update data may be a differential update file, and the differential update package records the difference between the application file of the first application version and the application file of the second application version. The target application can be upgraded from the first application version to the second application version by migrating the differential update file to the application file of the first application version.

The processing method further includes storing the target update data in a designated storage location (at 103), so that after the operating system is updated from the second system version to the first system version, the target update data in the designated storage location can be utilized to establish the target application having the second application version in the first system version. The designated storage location is a storage location where the target update data remain unchanged when the system version of the operating system is updated.

The target update data in the designated storage location remain unchanged when the system version of the operating system is updated. For example, all the data in the designated storage location is not be changed when the system version of the operating system is updated, such that the target update data remain unchanged when the system version of the operating system is updated.

In some embodiments, the designated storage location may be a storage location in a system partition. The data in the system partition remain unchanged when the system version of the operating system is updated. The designated storage location is the storage location where the target update data remain unchanged when the system version of the operating system is updated. In some other embodiments, the designated storage location may be a storage location in a data partition, and the data in the designated storage location in the data partition also needs to satisfy the similar feather as above. For example, the data in the designated storage location remain unchanged when the system version of the operating system is updated.

The operating system updates from the current second system version to the first system version, and the data in the designated storage location remain unchanged when the system version of the operating system is updated. In this way, the target update data in the designated storage location may be utilized to establish the target application having the second application version in the operating system of the first system version, and there is no need to re-obtain the target update data of the target application from the outside.

Figure 2:
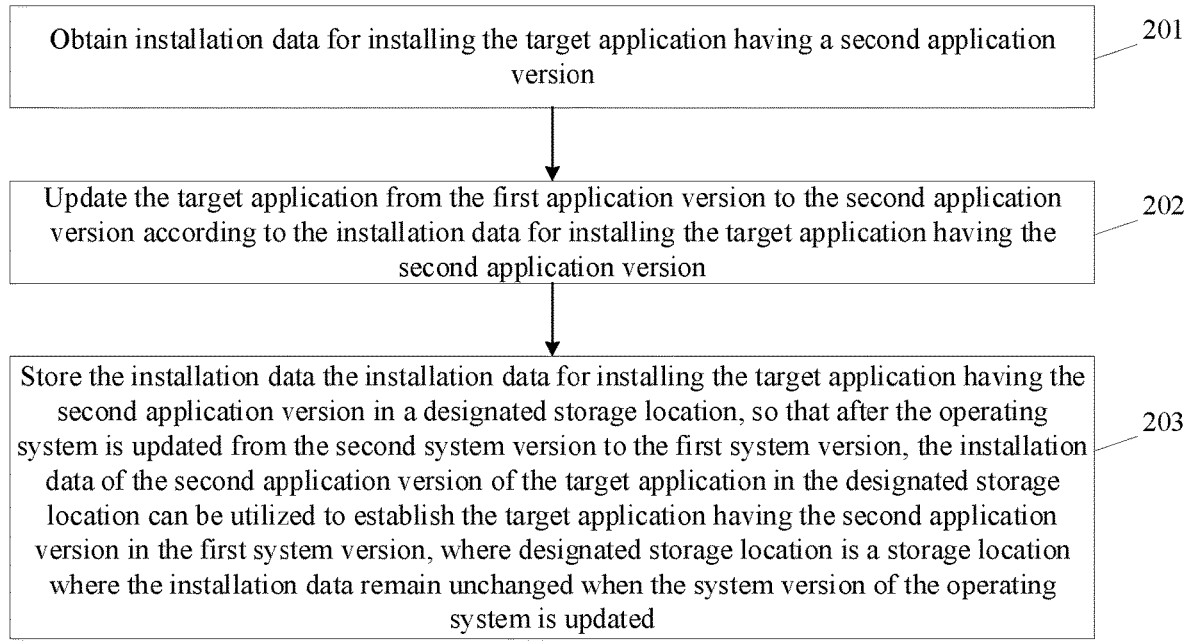
FIG. 2 is a schematic flowchart of a processing method according to some embodiments of the present disclosure.

FIG. 2 is a schematic flowchart of a processing method according to some embodiments of the present disclosure. As shown in FIG. 2, the processing method includes obtaining installation data for installing the target application having a second application version (at 201).

In one example, the target application can be a system application, such as an alarm clock application, a wireless local area network application, a camera application, etc. In another example, the target application can be a third-party application, such as a video application, a gaming application, a shopping application, etc.

The target application may be updated from the first application version to the second application version according to the installation data. In some embodiments, the first application version may be higher than the second application version. For example, the first application version may have a larger version number than the second application version. The first application version may be newer than the second application version. In this case, the target application can be restored to the second application version from the first application version according to the installation data. In some other embodiments, the first application version may be lower than the second application version. For example, the first application version may have a smaller version number than the second application version. The first application version may be older than the second application version. In this case, the target application may be upgraded from the first application version to the second application version according to the installation data.

Obtaining the installation data of the target application may be implemented by, but not limited to, the following manners.

In some embodiments, the electronic device can obtain the installation data of the target application from a server side. For example, when the electronic device is online (e.g., accessing a network, i.e., interconnected with the server through the network), the electronic device can send a heartbeat data packet to the server. The heartbeat data packet carries a current version information (e.g., the first application version) of the target application. After receiving the heartbeat data packet, the server can determine that the electronic device is online, and compare the first application version of the target application and the most updated application version of the target application. If the first application version is different from the most updated application version, the server can send the installation data of the most updated application version (e.g., the second application version) to the electronic device. The second application version is a higher version than the first application version, and the present disclosure is not limited thereto. The second application version can be different from the first application version. For example, when the first application version can be a higher version than the second application version, the server can send the installation data of the second application version to the electronic device. In some embodiments, the second application version is an application version that the user expects the target application to reach after the operating system is updated.

In some other embodiments, the electronic device acquires the installation data of the target application from other devices. For example, the electronic device acquires the installation data of the target application transmitted by another device through a point-to-point communication method (e.g., Bluetooth). For another example, the electronic device copies the installation data of the target application from an external storage device (such as a mobile hard disk). The installation data here correspond to the second application version of the target application. In comparison, a current version of the target application can be referred to as the first application version. In one example, the second application version may be a higher version than the first application version. In another example, the first application version may be a higher version than the second application version. The second application version can be an application version that the user expects the target application to reach after the operating system is updated.

The processing method further includes updating the target application from the first application version to the second application version according to the installation data for installing the target application having the second application version (at 202).

The installation data may be a complete update packet. The target application having the second application version can be installed by executing the installation data of the second application version. The installation data may be a complete application file. The target application having the second application version can be installed by migrating the application file of the second application version to a designated directory. When the target application having the second application version is installed, the target application having the previous first application version can be replaced.

The processing method further includes storing the installation data the installation data for installing the target application having the second application version in a designated storage location (at 203), so that after the operating system is updated from the second system version to the first system version, the installation data of the second application version of the target application in the designated storage location can be utilized to establish the target application having the second application version in the first system version. The designated storage location is a storage location where the installation data remain unchanged when the system version of the operating system is updated.

The installation data in the designated storage location remain unchanged when the system version of the operating system is updated. For example, all the data in the designated storage location is not be changed when the system version of the operating system is updated, such that the installation data remain unchanged when the system version of the operating system is updated.

In some embodiments, the designated storage location may be a storage location in a system partition. The data in the system partition remain unchanged when the system version of the operating system is updated. The designated storage location is the storage location where the installation data remain unchanged when the system version of the operating system is updated. In some other embodiments, the designated storage location may be a storage location in a data partition, and the data in the designated storage location in the data partition also needs to satisfy the similar feather as above. For example, the data in the designated storage location remain unchanged when the system version of the operating system is updated.

The operating system updates from the current second system version to the first system version, and the data in the designated storage location remain unchanged when the system version of the operating system is updated. In this way, the installation data of the second application version of the target application in the designated storage location may be utilized to establish the target application having the second application version in the operating system having the first system version, and there is no need to re-obtain the installation data of the second application version of the target application from the outside.

Figure 3:
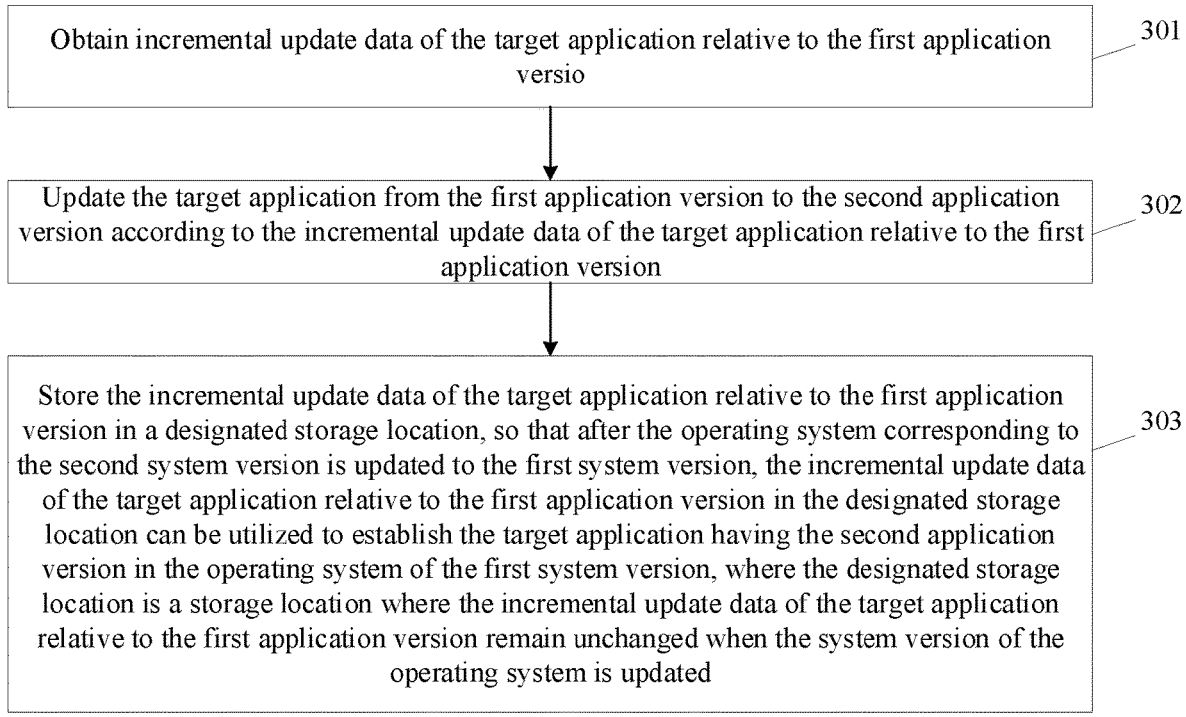
FIG. 3 is a schematic flowchart of a processing method according to some embodiments of the present disclosure.

FIG. 3 is a schematic flowchart of a processing method according to some embodiments of the present disclosure. As shown in FIG. 3, the processing method includes obtaining incremental update data of the target application relative to the first application version (at 301).

In one example, the target application can be a system application, such as an alarm clock application, a wireless local area network application, a camera application, etc. In another example, the target application can be a third-party application, such as a video application, a gaming application, a shopping application, etc.

In the embodiment of the present disclosure, the target application may be updated from the first application version to the second application version according to the incremental update data. In some embodiments, the first application version may be higher than the second application version. For example, the first application version may have a larger version number than the second application version. The first application version may be newer than the second application version. In this case, the target application can be restored to the second application version from the first application version according to the incremental update data. In some other embodiments, the first application version may be lower than the second application version. For example, the first application version may have a smaller version number than the second application version. The first application version may be older than the second application version. In this case, the target application may be upgraded from the first application version to the second application version according to the incremental update data.

In the embodiment of the present disclosure, obtaining the incremental update data relative to the first application version of the target application may be implemented by, but not limited to, the following manners.

In some embodiments, the electronic device can obtain the incremental update data of the target application from a server side. For example, when the electronic device is online (e.g., accessing a network, i.e., interconnected with the server through the network), the electronic device can send a heartbeat data packet to the server. The heartbeat data packet carries a current version information (e.g., the first application version) of the target application. After receiving the heartbeat data packet, the server can determine that the electronic device is online, and compare the first application version of the target application and the most updated application version of the target application. If the first application version is different from the most updated application version, the server can send the incremental update data of the most updated application version (e.g., the second application version) relative to the first application version to the electronic device. The second application version is a higher version than the first application version, and the present disclosure is not limited thereto. The second application version can be different from the first application version. For example, when the first application version can be a higher version than the second application version, the server can send the incremental update data relative to the first application version to the electronic device. In some embodiments, the second application version is an application version that the user expects the target application to reach after the operating system is updated.

In some other embodiments, the electronic device acquires the incremental update data of the target application relative to the first application version from other devices. For example, the electronic device acquires the incremental update data of the target application relative to the first application version transmitted by another device through a point-to-point communication method (e.g., Bluetooth). For another example, the electronic device copies the incremental update data of the target application relative to the first application version from an external storage device (such as a mobile hard disk). The incremental update data of the target application relative to the first application version here corresponds to the second application version of the target application. In comparison, a current version of the target application can be referred to as the first application version. In one example, the second application version may be a higher version than the first application version. In another example, the first application version may be a higher version than the second application version. The second application version can be an application version that the user expects the target application to reach after the operating system is updated.

The processing method further includes updating the target application from the first application version to the second application version according to the incremental update data of the target application relative to the first application version (at 302). In this way, the target application can be upgraded to from the first application version to the second application version.

For example, the incremental update data may be a differential update package, and the differential update package records the difference between the installation data of the first application version and the installation data of the second application version. The target application can be upgraded from the first application version to the second application version by executing the incremental update data. For another example, the incremental update data may be a differential update file, and the differential update package records the difference between the application file of the first application version and the application file of the second application version.

The processing method further includes storing the incremental update data of the target application relative to the first application version in a designated storage location (at 303), so that after the operating system corresponding to the second system version is updated to the first system version, the incremental update data of the target application relative to the first application version in the designated storage location can be utilized to establish the target application having the second application version in the operating system of the first system version. The designated storage location is a storage location where the incremental update data of the target application relative to the first application version remain unchanged when the system version of the operating system is updated.

The incremental update data of the target application relative to the first application version in the designated storage location remain unchanged when the system version of the operating system is updated. For example, all the data in the designated storage location remain unchanged when the system version of the operating system is updated, such that the incremental update data of the target application relative to the first application version remain unchanged when the system version of the operating system is updated.

In some embodiments, the designated storage location may be a storage location in a system partition. The data in the system partition remain unchanged when the system version of the operating system is updated. The designated storage location is the storage location where the incremental update data of the target application relative to the first application version remain unchanged when the system version of the operating system is updated. In some other embodiments, the designated storage location may be a storage location in a data partition, and the data in the designated storage location in the data partition also needs to satisfy the similar feather as above. For example, the data in the designated storage location remain unchanged when the system version of the operating system is updated.

The operating system updates from the current second system version to the first system version, and the data in the designated storage location remain unchanged when the system version of the operating system is updated. In this way, the incremental update data of the target application relative to the first application version in the designated storage location may be utilized to establish the target application having the second application version in the operating system of the first system version, and there is no need to obtain the target update data of the target application from the outside.

In some embodiments, the installation data of the first system version of the operating system includes installation data of the first application version of the target application, and the installation data of the first system version of the operating system is used to install the target application having the first application version in the operating system of the first system version after establishing the operating system of the first system version. The installation data of the first system version of the operating system may be system installation data of an original version when the electronic device is manufactured, or system installation data of other versions backed up by the user. By running the installation data of the first system version, the current operating system of the electronic device can be updated to the first system version. For example, if the first system version of the operating system is the factory operating system, when the operating system of the electronic device is restored to the factory operating system, all applications (including the target application) may return to the factory version. For another example, if the operating system of the first system version is an operating system 1 (e.g., version 1), when the operating system is updated to an operating system 2 (e.g., version 2), the version of the target application may be automatically updated to a version in system 2. After updating the operating system, the user expects the target application to reach the second application version. Therefore, it is necessary to use the incremental update data of the target application relative to the first application version that are stored in the designated storage location to update the target application from the first application version to the second application version.

In some other embodiments, the installation data of the first system version of the operating system does not include installation data of the first application version of the target application. After the installation data of the first system version of the operating system is used to establish the operating system of first system version, the operating system of first system version does not include the target application. In this case, the installation data of the first application version of the target application is used to establish the target application in the operating system of the first system version. The difference update date of the target application relative to the first application version in the designated storage location is used to update the target application from the first application version to the second application version.

Figure 4:
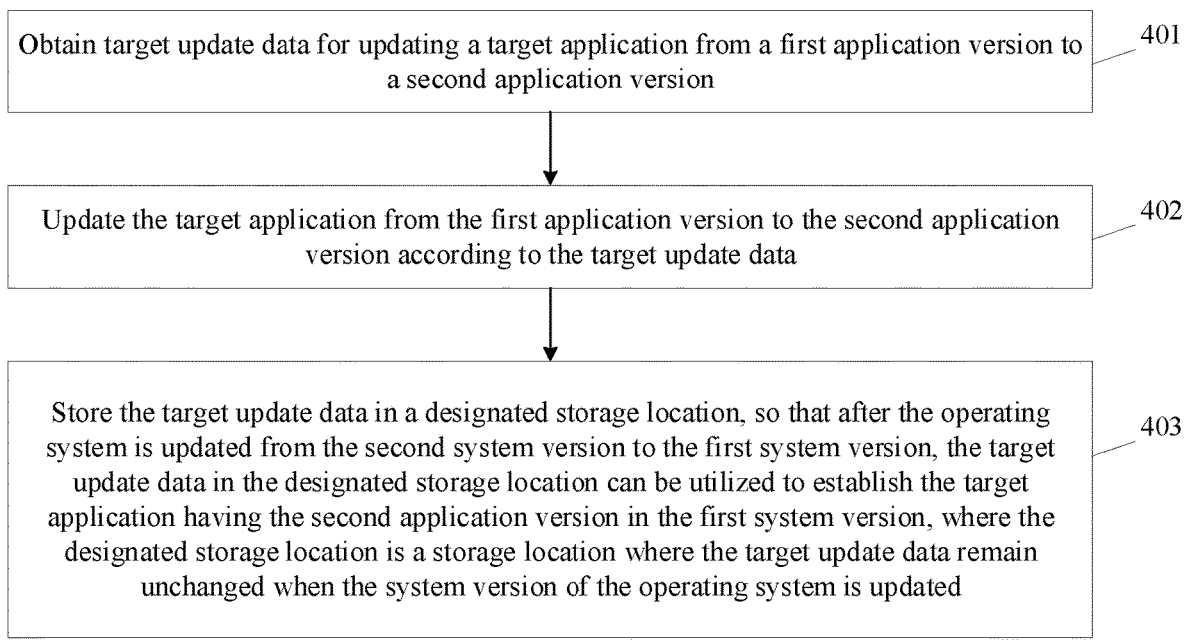
FIG. 4 is a schematic flowchart of a processing method according to some embodiments of the present disclosure.

FIG. 4 is a schematic flowchart of a processing method according to some embodiments of the present disclosure. As shown in FIG. 4, the processing method may include obtaining target update data for updating a target application from a first application version to a second application version (at 401).

In one example, the target application can be a system application, such as an alarm clock application, a wireless local area network application, a camera application, etc. In another example, the target application can be a third-party application, such as a video application, a gaming application, a shopping application, etc.

In the embodiment of the present disclosure, the target application may be updated from the first application version to the second application version according to the target update data. In some embodiments, the first application version may be higher than the second application version. For example, the first application version may have a larger version number than the second application version. The first application version may be newer than the second application version. In this case, the target application can be restored to the second application version from the first application version according to the target update data. In some other embodiments, the first application version may be lower than the second application version. For example, the first application version may have a smaller version number than the second application version. The first application version may be older than the second application version. In this case, the target application may be upgraded from the first application version to the second application version according to the target update data.

Obtaining the target update data of the target application may be implemented by, but not limited to, the following manners.

In some embodiments, the electronic device can obtain the target update data of the target application from a server side. For example, when the electronic device is online (e.g., accessing a network, i.e., interconnected with the server through the network), the electronic device can send a heartbeat data packet to the server. The heartbeat data packet carries a current version information (e.g., the first application version) of the target application. After receiving the heartbeat data packet, the server can determine that the electronic device is online, and compare the first application version of the target application and the most updated application version of the target application. If the first application version is different from the most updated application version, the server can send the target update data of the most updated application version (e.g., the second application version) to the electronic device. The second application version is a higher version than the first application version, and the present disclosure is not limited thereto. The second application version can be different from the first application version. For example, when the first application version can be a higher version than the second application version, the server can send the target update data of the second application version to the electronic device. In some embodiments, the second application version is an application version that the user expects the target application to reach after the operating system is updated.

In some other embodiments, the electronic device acquires the target update data of the target application from other devices. For example, the electronic device acquires the target update data of the target application transmitted by another device through a point-to-point communication method (e.g., Bluetooth). For another example, the electronic device copies the target update data of the target application from an external storage device (such as a mobile hard disk). The target update data here correspond to the second application version of the target application. In comparison, a current version of the target application can be referred to as the first application version. In one example, the second application version may be a higher version than the first application version. In another example, the first application version may be a higher version than the second application version. The second application version can be an application version that the user expects the target application to reach after the operating system is updated.

The processing method further includes updating the target application from the first application version to the second application version according to the target update data (at 402).

In some embodiments, the target update data can be installation data for installing the target application having the second application version. The installation data may be a complete update packet. The target application having the second application version can be installed by executing the installation data of the second application version. The installation data may be a complete application file. The target application having the second application version can be installed by migrating the application file of the second application version to a designated directory. When the target application having the second application version is installed, the target application having the previous first application version can be replaced.

In some other embodiments, the target update data are incremental update data of the target application relative to the first application version. For example, the incremental update data may be a differential update package, and the differential update package records the difference between the installation data of the first application version and the installation data of the second application version. The target application can be upgraded from the first application version to the second application version by executing the incremental update data. For another example, the incremental update data may be a differential update file, and the differential update package records the difference between the application file of the first application version and the application file of the second application version. The target application can be upgraded from the first application version to the second application version by migrating the differential update file to the application file of the first application version.

The processing method further includes storing the target update data in a designated storage location (at 403), so that after the operating system is updated from the second system version to the first system version, the target update data in the designated storage location can be utilized to establish the target application having the second application version in the first system version. The designated storage location is a storage location where the target update data remain unchanged when the system version of the operating system is updated.

The target update data in the designated storage location remain unchanged when the system version of the operating system is updated. For example, all the data in the designated storage location remain unchanged when the system version of the operating system is updated, such that the target update data remain unchanged when the system version of the operating system is updated.

In some embodiments, the designated storage location may be a storage location in a system partition. The data in the system partition is changed when the system version of the operating system is updated. The designated storage location is the storage location where the target update data remain unchanged when the system version of the operating system is updated. In some other embodiments, the designated storage location may be a storage location in a data partition, and the data in the designated storage location in the data partition also needs to satisfy the similar feather as above. For example, the data in the designated storage location remain unchanged when the system version of the operating system is updated.

The operating system updates from the current second system version to the first system version, and the data in the designated storage location remain unchanged when the system version of the operating system is updated. In this way, the target update data in the designated storage location may be utilized to establish the target application having the second application version in the operating system of the first system version, and there is no need to re-obtain the target update data of the target application from the outside.

In the embodiment of the present disclosure, when the target update data are stored in the designated storage location can be determined in the following manners.

In one example, after updating the target application from the first application version to the second application version, the target update data are immediately stored in the designated storage location.

In this manner, if the electronic device updates the target application by using the target update data, the target update data are immediately stored in the designated storage location.

In another example, after updating the target application from the first application version to the second application version, operation information of the target application having the second application version is obtained. Based on the operation information of the target application having the second application version, it can be determined whether the target application having the second application version satisfies a preset condition. If the target application having the second application version satisfies the preset condition, the target update data are stored in the designated storage location.

Here, the preset condition may be, for example, no abnormal operation event has occurred, or an evaluation information or calibration information that is obtained by an external device or a user about the second application version meets a standard.

For example, the preset condition may be no abnormal operation event has occurred. After the target application is updated to the second application version, the operation information of the target application having the second application version is obtained. Based on the operation information of the target application having the second application version, it can be determined whether an abnormal operation event of the target application having the second application version has occurred. If no abnormal operation event of the target application having the second application version has occurred, the target update data are stored in the designated storage location.

In this manner, after updating the target application by using the target update data, the electronic device determines whether to store the target update data in the designated storage location based on the updated operation information of the target application having the second application version. Based on the operation information of the target application having the second application version, it can be determined whether an abnormal operation event of the target application having the second application version has occurred. If no abnormal operation event of the target application having the second application version has occurred, the target update data are stored in the designated storage location. In an exemplary implementation manner, the operation information may be operation information in a certain time period, for example, 1 day, 1 week, and etc. The abnormal operation event be flashback, stuck, abnormal network connection, etc. If an abnormal operation event occurs, it indicates that the target application having the second application version has a vulnerability, which needs to be improved, and the target update data do not need to be stored to the designated storage location. On the other hand, if the target application having the second application version does not have an abnormal operation event, it indicates that the target application having the second application version runs stably, and the target update data may be stored in the designated storage location.

In some embodiments, there may be one or a plurality of target applications that need to be updated. For example, below described some embodiments in which the plurality of target applications is updated.

Figure 5:
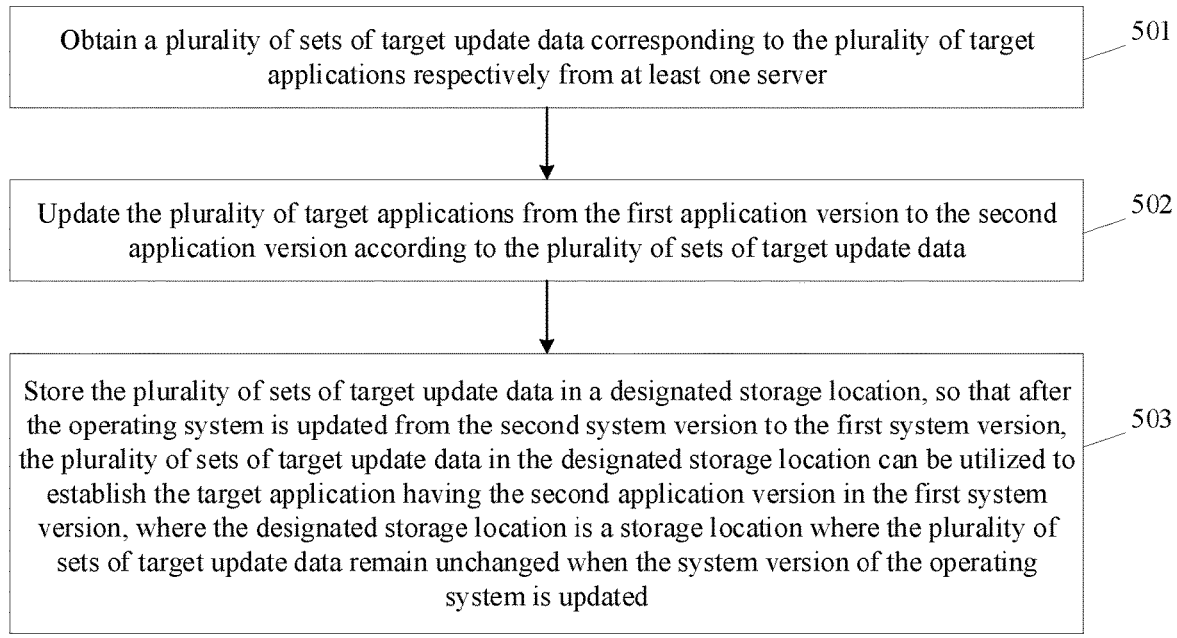
FIG. 5 is a schematic flowchart of a processing method according to some embodiments of the present disclosure.

FIG. 5 is a schematic flowchart of a processing method according to some embodiments of the present disclosure. As shown in FIG. 5, the processing method includes obtaining a plurality of sets of target update data corresponding to the plurality of target applications respectively from at least one server (at 501).

In one example, the target application can be a system application, such as an alarm clock application, a wireless local area network application, a camera application, etc. In another example, the target application can be a third-party application, such as a video application, a gaming application, a shopping application, etc.

The target application may be updated from the first application version to the second application version according to the installation data. In some embodiments, the first application version may be higher than the second application version. For example, the first application version may have a larger version number than the second application version. The first application version may be newer than the second application version. In this case, the target application can be restored to the second application version from the first application version according to the installation data. In some other embodiments, the first application version may be lower than the second application version. For example, the first application version may have a smaller version number than the second application version. The first application version may be older than the second application version. In this case, the target application may be upgraded from the first application version to the second application version according to the installation data.

For system applications, the electronic device may obtain more than one sets of target update data corresponding to one or more system applications from the system server. For a third-party application, different third-party applications may correspond to different third-party application servers, and the electronic device may obtain more than one sets of target update data corresponding to one or more third-party applications from the corresponding third-party application servers.

The processing method further includes updating the plurality of target applications from the first application version to the second application version according to the plurality of sets of target update data (at 502).

In some embodiments, the update of each target application does not affect each other, and the electronic device updates the plurality of target applications from the first application version to the second application version respectively according to the plurality of sets of target update data.

In some embodiments, the target update data can be installation data for installing the target application having the second application version. The installation data may be a complete update packet. The target application having the second application version can be installed by executing the installation data of the second application version. When the target application having the second application version is installed, the target application having the previous first application version can be replaced.

In some other embodiments, the target update data are incremental update data of the target application relative to the first application version. For example, the incremental update data may be a differential update package, and the differential update package records the difference between the installation data of the first application version and the installation data of the second application version. The target application can be upgraded from the first application version to the second application version by executing the incremental update data.

The processing method further includes storing the plurality of sets of target update data in a designated storage location (at 503), so that after the operating system is updated from the second system version to the first system version, the plurality of sets of target update data in the designated storage location can be utilized to establish the target application having the second application version in the first system version. The designated storage location is a storage location where the plurality of sets of target update data remain unchanged when the system version of the operating system is updated.

In some embodiments, the designated storage location may be a storage location in a system partition. The data in the system partition is changed when the system version of the operating system is updated. The designated storage location is the storage location where the target update data remain unchanged when the system version of the operating system is updated. In some other embodiments, the designated storage location may be a storage location in a data partition, and the data in the designated storage location in the data partition also needs to satisfy the similar feather as above. For example, the data in the designated storage location remain unchanged when the system version of the operating system is updated.

The operating system updates from the current second system version to the first system version, and the data in the designated storage location remain unchanged when the system version of the operating system is updated. In this way, the plurality of sets of target update data in the designated storage location may be utilized to establish the target application having the second application version in the operating system of the first system version, and there is no need to re-obtain the plurality of sets of target update data of the target application from the outside.

For example, there are N sets of target update data corresponding to N target applications stored in the designated storage location. In one example, after the operating system is updated, the N sets of target updates data of the N target applications are automatically obtained from the designated storage location. The N sets of target updates data of the N target applications can be utilized to establish the N target applications of the second application versions in the operating system of the first system version. In another example, a first upgrade operation is obtained, and a first upgrade instruction is generated, where the first upgrade instruction is used to trigger all updates to the N target applications. In response to the first upgrade instruction, the N sets of target updates data of the N target applications can be obtained from the designated storage location. The N sets of target updates data of the N target applications can be utilized to establish the N target applications of the second application versions in the operating system of the first system version.

In some embodiments, one or more target applications specified in the plurality of target applications may be selectively updated. For example, an update operation may be obtained, and an update instruction is generated, where the update instruction is used to trigger updates to the one or more target applications specified in the plurality of target applications. In response to the update instruction, the target update data corresponding to the one or more target applications specified in the plurality of target applications can be obtained from the designated storage location. the target update data corresponding to the one or more target applications specified in the plurality of target applications can be utilized to establish the one or more target applications specified in the plurality of target applications of the second application versions in the operating system of the first system version. For example, M sets of target update data ($1 \leq M < N$) from N sets of target update data can be obtained from the designated storage location. The M sets of target update data can be utilized to establish M corresponding target applications of the second application versions in the operating system of the first system version.

Figure 6:
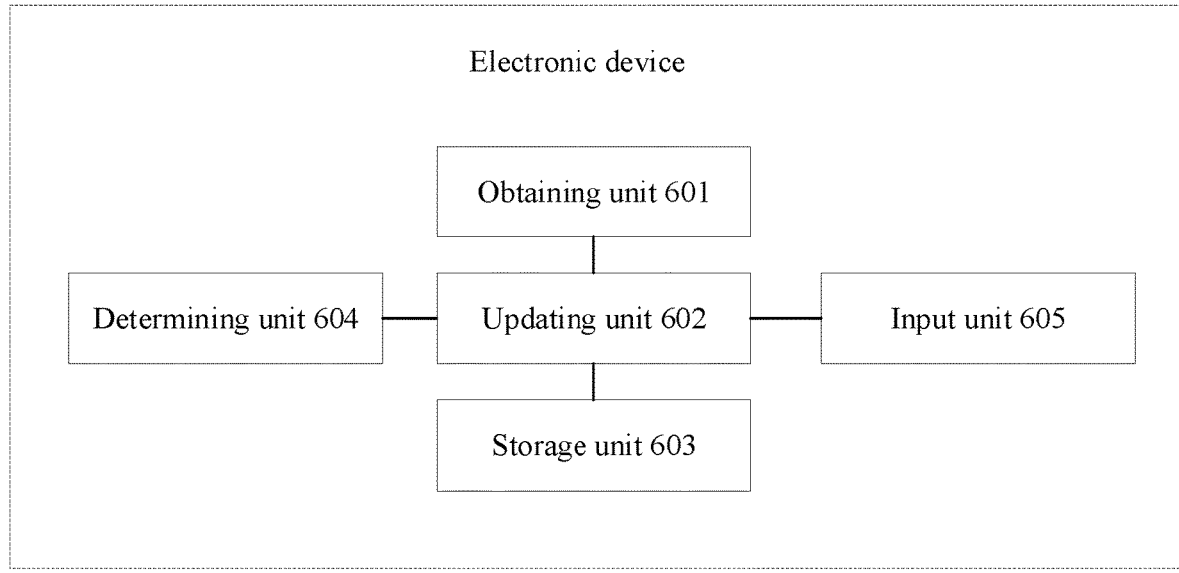
FIG. 6 is a schematic structural diagram of an electronic device according to some embodiments of the present disclosure.

FIG. 6 is a schematic structural diagram of an electronic device according to some embodiments of the present disclosure. As shown in FIG. 6, the electronic device includes an obtaining unit 601, an updating unit 602, and a storage unit 603. The obtaining unit 601 can obtain target update data for updating a target application from a first application version to a second application version. The updating unit 602 can update the target application from the first application version to the second application version according to the target update data. The storage unit 603 can store the target update data in a designated storage location, so that after the operating system is updated from the second system version to the first system version, the target update data in the designated storage location can be utilized to establish the target application having the second application version in the first system version. The designated storage location is a storage location where the target update data remain unchanged when the system version of the operating system is updated.

In some embodiments, the target update data are installation data of the second application version of the target application. The updating unit 602 can establish the target application having the second application version in the operating system of the first system version by using the installation data of the second application version of the target application in the designated storage location.

In some embodiments, the target update data are incremental update data of the target application relative to the first application version. The updating unit 602 can use the incremental update data of the target application in the designated storage location relative to the first application version, and the installation data of the first application version of the target application to establish the target application having the second application version in the operating system of the first system version. The installation data of the first application version of the target application are stored in the designated storage location.

In some embodiments, the updating unit 602 can use the installation data of the first system version of the operating system to establish the operating system of the first system version. The installation data of the first system version includes installation data of the first application version of the target application, where the operating system of the first system version includes the target application having the first application version. The updating unit 602 can update the target application from the first application version to the second application version by using incremental update data of the target application relative to the first application version in the designated storage location.

In some embodiments, the updating unit 602 can establish the operating system of the first system version by using installation data of a first system version of the operating system.

The updating unit 602 can use the installation data of the first application version of the target application to establish the target application having the first application version in the operating system of the first system version.

The updating unit 602 can update the target application from the first application version to the second application version by using incremental update data of the target application relative to the first application version in the designated storage location.

In some embodiments, the storage unit 603 can store the target update data in the designated storage location after updating the target application from the first application version to the second application version.

In some embodiments, the device further includes a determining unit 604. The determining unit 604 can obtain operation information of the target application having the second application version after updating the target application from the first application version to the second application version; and determine whether an abnormal operation event of the target application having the second application version has occurred, based on the operation information of the target application having the second application version. If no abnormal operation event of the target application having the second application version has occurred, the storage unit 603 can store the target update data in the designated storage location.

In some embodiments, the obtaining unit 601 can obtain a plurality of sets of target update data corresponding to the plurality of target applications respectively from the at least one server. The updating unit 602 can update the plurality of target applications from the first application version to the second application version according to the plurality of sets of target update data.

In some embodiments, the device further includes an input unit 605. The input unit 605 can obtain an update operation, and generate an update instruction. The update instruction is used to trigger updating of a designated part of the target applications in the plurality of target applications. The updating unit 602 can obtain target update data corresponding to the designated part of target applications from the designated storage location in response to the update instruction; and use the target update data corresponding to the designated part of target applications respectively to establish the designated part of target application having the second application.

Those skilled in the art should understand that for the implementation functions of the units in the electronic device shown in FIG. 6, references can be made to the related description of the foregoing processing method. The functions of the units in the electronic device shown in FIG. 6 can be implemented by a program running on a processor, or can be realized by a logic circuit.

The device for acquiring terminal capabilities described above in the embodiment of the present disclosure may also be stored in a computer readable storage medium if it is implemented in the form of a software function module and sold or used as a stand-alone product. Based on such understanding, the technical solution of the embodiments of the present disclosure may be embodied in the form of a software product in essence or in the form of a software product stored in a storage medium, including a plurality of instructions. When the plurality of instructions is executed by a computer device (which may be a personal computer, server, or network device, etc.), the computer device can perform all or part of the methods described in various embodiments of the present disclosure. The foregoing storage medium may include various media that can store program codes, such as a USB flash drive, a mobile hard disk, a read only memory (ROM), a magnetic disk, or an optical disk. Thus, embodiments of the present disclosure are not limited to any specific combination of hardware and software.

Accordingly, another aspect of the present disclosure also provides a computer storage medium. The computer storage medium stores computer-executable instructions. When the computer-executable instructions are executed by a processor, the above described processing methods according to some embodiments of the present disclosure can be implemented.

Figure 7:
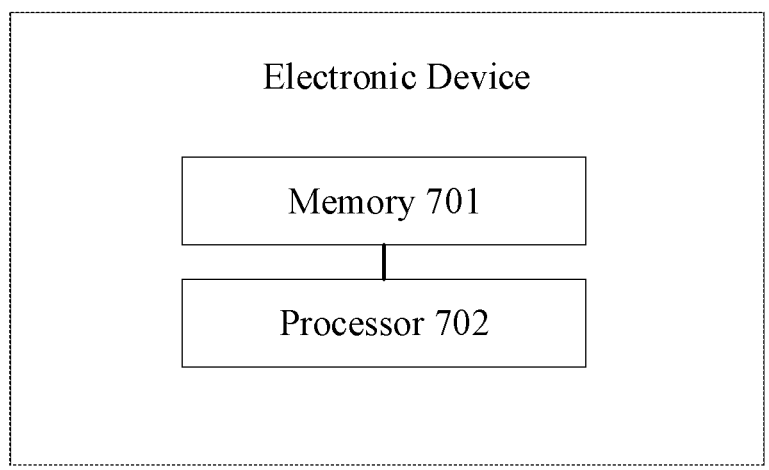
FIG. 7 is a schematic structural diagram of an electronic device according to some embodiments of the present disclosure.

FIG. 7 is a schematic structural diagram of an electronic device according to some embodiments of the present disclosure. As shown in FIG. 7, the electronic device includes a memory 701 and a processor 702. The memory 701 can store computer-executable instructions. The processor 702 can communicate with the memory 701 to execute the computer-executable instructions to implement the following steps: obtaining target update data for updating a target application from a first application version to a second application version; updating the target application from the first application version to the second application version according to the target update data; and storing the target update data in a designated storage location, so that after the operating system is updated from the second system version to the first system version, the target update data in the designated storage location can be utilized to establish the target application having the second application version in the first system version. The designated storage location is a storage location where the target update data remain unchanged when the system version of the operating system is updated.

In some embodiments, the target update data are installation data of a second application version of the target application;

The processor 702 can use the installation data of the second application version of the target application in the designated storage location to establish the target application having the second application version in the operating system of the first system version.

In some embodiments, the target update data are incremental update data of the target application relative to the first application version.

The processor 702 can use the incremental update data of the target application in the designated storage location relative to the first application version, and the installation data of the first application version of the target application to establish the target application having the second application version in the operating system of the first system version. The installation data of the first application version of the target application are stored in the designated storage location.

In some embodiments, the processor 702 can use the installation data of the first system version of the operating system to establish the operating system of the first system version. The installation data of the first system version includes installation data of the first application version of the target application, where the operating system of the first system version includes the target application having the first application version. The updating unit 602 can update the target application from the first application version to the second application version by using incremental update data of the target application relative to the first application version in the designated storage location.

In some embodiments, the processor 702 can establish the operating system of the first system version by using installation data of a first system version of the operating system; use the installation data of the first application version of the target application to establish the target application having the first application version in the operating system of the first system version; and update the target application from the first application version to the second application version by using incremental update data of the target application relative to the first application version in the designated storage location.

In some embodiments, the processor 702 can store the target update data in the designated storage location after updating the target application from the first application version to the second application version.

In some embodiments, the processor 702 can obtain operation information of the target application having the second application version after updating the target application from the first application version to the second application version; and determine whether an abnormal operation event of the target application having the second application version has occurred, based on the operation information of the target application having the second application version. If no abnormal operation event of the target application having the second application version has occurred, the processor 702 can store the target update data in the designated storage location.

In some embodiments, the processor 702 can obtain a plurality of sets of target update data corresponding to the plurality of target applications respectively from the at least one server, and update the plurality of target applications from the first application version to the second application version according to the plurality of sets of target update data.

In some embodiments, the processor 702 can obtain an update operation, and generate an update instruction. The update instruction is used to trigger updating of a designated part of the target applications in the plurality of target applications. the processor 702 can obtain target update data corresponding to the designated part of target applications from the designated storage location in response to the update instruction; and use the target update data corresponding to the designated part of target applications respectively to establish the designated part of target application having the second application.

The technical solutions described in the embodiments of the present disclosure may be arbitrarily combined without conflict.

In the embodiments provided by the present disclosure, it should be understood that the disclosed method and smart device may be implemented in other manners. The device embodiments described above are merely illustrative. For example, the division of the unit is only a logical function division. In actual applications, there may be another division manner. For example, multiple units or components may be combined or can be integrated into another system, or some features can be ignored or not executed. In addition, the coupling, or direct coupling, or communication connection of the components shown or discussed may be indirect coupling or communication connection through some interfaces, devices or units, and may be electrical, mechanical or other forms.

The units described above as separate components may or may not be physically separated, and the components displayed as the unit may or may not be physical units, that is, may be located in one place or distributed to multiple network units. Some or all of the units may be selected according to actual needs to achieve the purpose of the technical solutions of the embodiments.

In addition, each functional unit in each embodiment of the present disclosure may be integrated into one second processing unit, or each unit may be separately used as one unit, or two or more units may be integrated into one unit. The above integrated unit can be implemented in the form of hardware or in the form of hardware combined with software functional units.

The above is only some embodiments of the present disclosure, but the scope of the present disclosure is not limited thereto. Any person skilled in the art can make changes or substitutions within the technical scope of the present disclosure. These changes and substitutions should fall within the scope of the present disclosure. Therefore, the scope of protection of the present disclosure should be determined by the scope of the claims.

What is claimed is:

1. A processing method comprising:
obtaining target update data, by an electronic device from at least one another device via a point-to point communication, for updating a target application from a first application version to a second application version, the target update data including installation data for installing the target application having the second application version on the electronic device having a second system version of an operating system;
determining, according to operation information of the installation data, the second application version having an abnormal operation event;
in response to the second application version having the abnormal operation event and the first application version having a newer version number than the second application version, restoring the target application on the electronic device from the second application version to the first application version according to the target update data;
storing the target update data in the electronic device in a designated storage location where the target update data remain unchanged when the system version of the operating system is updated, negating the need to re-obtain the target update data from any source outside the electronic device;
updating the operating system on the electronic device to a first system version from the second system version; and
establishing, after the operating system on the electronic device is updated to the first system version from the second system version, the target application of the first application version in the operating system of the first system version by using the target update data in the designated storage location.

2. The processing method of claim 1, wherein:
the target update data include incremental update data of the target application relative to the first application version; and
establishing the target application having the first application version in the operating system of the first system version by using the target update data in the designated storage location includes:
establishing, by using the incremental update data of the target application relative to the second application version and installation data for installing the target application having the first application version, the target application having the second application version in the operating system of the first system version, wherein the installation data for installing the target application having the first application version are stored in the designated storage location.

3. The processing method of claim 2, wherein establishing the target application having the first application version in the operating system of the first system version, includes:
establishing, based on the installation data for installing the operating system of the first system version, the operating system of the first system version, wherein the installation data for installing the operating system of the first system version includes the installation data for installing the target application having the first application version, and the operating system of the first system version includes the target application having the first application version; and
updating, by using the incremental update data of the target application relative to the second application version in the designated storage location, the target application from the second application version to the first application version.

4. The processing method of claim 3, wherein establishing the target application having the first application version in the operating system of the first system version, includes:
establishing, by using the installation data for installing the operating system of the first system version, the operating system of the first system version;

establishing, by using the installation data for installing the target application having the first application version, the target application having the first application version in the operating system of the first system version; and updating, by using the incremental update data of the target application relative to the second application version in the designated storage location, the target application from the second application version to the first application version.

5. The processing method of claim 1, wherein storing the target update data in the designated storage location comprises:

storing, after restoring the target application from the second application version to the first application version, the target update data in the designated storage location.

6. The processing method of claim 1, wherein obtaining target update data of the target application comprises:

obtaining a plurality of sets of target update data corresponding to a plurality of target applications respectively from the at least one another device.

7. The processing method of claim 6, wherein restoring the target application from the second application version to the first application version according to the target update data comprises:

restoring, according to the plurality of sets of target update data, the plurality of target applications from the second application version to the first application version.

8. The processing method of claim 7, wherein establishing the target application having the first application version in the operating system of the first system version by using the target update data in the designated storage location, includes:

obtaining an update operation to generate an update instruction, the update instruction being configured to trigger an update on a part of the target applications specified in the plurality of target applications;

obtaining, in response to the update instruction and from the designated storage location, target update data corresponding to the part of the target applications specified in the plurality of target applications; and establishing, by using the target update data corresponding to the part of the target applications specified in the plurality of target applications, the part of the target applications having the first application version in the operating system of the first system version.

9. An electronic device, comprising:

a memory for storing computer-executable instructions;

a processor for communicating with the memory to execute the computer-executable instructions, which when executed by the processor, cause the processor to:

obtain target update data, by the electronic device from at least one another device via a point-to point communication, for updating a target application from a first application version to a second application version, the target update data including installation data for installing the target application having the second application version on the electronic device having a second system version of an operating system;

determine, according to operation information of the installation data, the second application version having an abnormal operation event;

in response to the second application version having the abnormal operation event and the first application version having a newer version number than the application version, restore the target application from the second application version to the first application version according to the target update data;

store the target update data in the electronic device in a designated storage location where the target update data remain unchanged when the system version of the operating system is updated, negating the need to re-obtain the target update data from any source outside the electronic device;

update the operating system to a first system version from a second system version; and establish, after the operating system is updated to the first system version from the second system version, the target application of the first application version in the operating system of the first system version by using the target update data in the designated storage location.

10. The electronic device of claim 9, wherein:

the target update data include incremental update data of the target application relative to the first application version; and the processor is further caused to:

establish, by using the incremental update data of the target application relative to the first application version and installation data for installing the target application having the first application version, the target application having the second application version in the operating system of the first system version, wherein the installation data for installing the target application having the first application version are stored in the designated storage location.

11. The electronic device of claim 10, wherein the processor is further caused to:

establish, based on installation data for installing the operating system of the first system version, the operating system of the first system version, wherein the installation data for installing the operating system of the first system version includes the installation data for installing the target application having the first application version, and the operating system of the first system version includes the target application having the first application version; and update, by using the incremental update data of the target application relative to the second application version in the designated storage location, the target application from the second application version to the first application version.

12. The electronic device of claim 11, wherein the processor is further caused to:

establish, by using installation data for installing the operating system of the first system version, the operating system of the first system version;

establish, by using the installation data for installing the target application having the first application version, the target application having the first application version in the operating system of the first system version; and updating, by using the incremental update data of the target application relative to the second application version in the designated storage location, the target application from the second application version to the first application version.

13. The electronic device of claim 9, wherein the processor is further caused to:
   store, after restoring the target application from the second application version to the first application version, the target update data in the designated storage location.

14. The electronic device of claim 9, wherein the processor is further caused to:
   obtain a plurality of sets of target update data corresponding to a plurality of target applications respectively from the at least one another device.

15. The electronic device of claim 14, wherein the processor is further caused to:
   restore, according to the plurality of sets of target update data, the plurality of target applications from the second application version to the first application version.

\* \* \* \* \*